March 3, 1970 — L. E. MYLTING — 3,498,328

ROTARY VALVE

Original Filed Nov. 16, 1964 — 2 Sheets-Sheet 1

INVENTOR.
LAURITZ E. MYLTING
BY
his ATTORNEYS

March 3, 1970

L. E. MYLTING 3,498,328

ROTARY VALVE

Original Filed Nov. 16, 1964

INVENTOR.
LAURITZ E. MYLTING
BY
Bumbaugh, Free, Graves & Donohue
his ATTORNEYS

United States Patent Office 3,498,328
Patented Mar. 3, 1970

3,498,328
ROTARY VALVE
Lauritz E. Mylting, Ardmore, Pa., assignor to Buell Engineering Company, Inc., New York, N.Y., a corporation of New York
Continuation of application Ser. No. 411,418, Nov. 16, 1964. This application Dec. 29, 1967, Ser. No. 694,756
Int. Cl. F16k 11/08, 31/04
U.S. Cl. 137—625.46         19 Claims

ABSTRACT OF THE DISCLOSURE

A rotary valve comprising a housing having a pair of spaced-apart housing end members with parallel inner surfaces, an inlet conduit communicating with the housing through one of the end members and at least two outlet conduits communicating with the housing through the other end member. A valve plug is rotatably mounted in the housing and is formed with a passage arranged to be in selective registration with the inlet and with any one of the outlets, as determined by the angular position of the plug. The axis of rotation of the plug lies at substantial angles to the plane through the axes of any two adjacent outlet conduits and to the axis of the inlet conduit and it is also perpendicular to the parallel surfaces of the housing end members. The valve is used to divert fluids flowing through a conduit to one or more distribution points.

---

This application is a continuation of application Ser. No. 411,418, filed Nov. 16, 1964, now abandoned.

This invention relates to rotary valves and, more particularly, to a novel and improved rotary valve which is small and compact in size, simple in structure, versatile in operation, and enables straight-through flow from the inlet conduit to one outlet conduit and diverted flow through one or more other outlet conduits.

One presently known type of rotary valve is a 45° lateral diverter valve, which comprises an inlet conduit and two outlet conduits which diverge from each other at 45° and in which the axis of the inlet and the axes of the two outlet conduits all lie on the same plane. The axis of the inlet conduit may be aligned with the axis of one of the outlet conduits so that straight-through flow is provided through the valve when it is in one of its two open positions. The valve includes a housing from which the inlet and outlet conduits extend, and a valve plug is rotatably mounted in the housing, the plug having a passage therethrough aligned such that, depending upon the angular position of the plug, the passage provides communication between the inlet and either one of the two outlet conduits.

There are a number of disadvantages to presently known 45° lateral valves. For one thing, if it is desired to prevent the inlet conduit from communicating with both of the two outlet conduits simultaneously, for example, as the valve plug is rotated to close one outlet and open the other, then the ends of the outlet conduits must be spaced apart a distance greater than 1.414 times the diameter of the conduits. This wide spacing of the axes of the outlet conduits necessitates increasing the diameter and the thickness of the plug. Thus, the above-described type of valve is of large size and occupies an often unreasonably great amount of space, is of heavy construction and is usually expensive to produce and install.

On the other hand, if it is desired to provide communication of the inlet conduit with both of the outlet conduits at the same time, then the centers of the ends of the outlet conduits must be spaced at a distance less than 1.414 times the diameter of the conduits. In this case, however, there is no way of preventing simultaneous communication with both outlets if it is desired; for example, it is not possible to completely close off one outlet conduit from the inlet conduit before opening the other outlet conduit to the inlet conduit, nor is it possible to completely close the valve.

Thus, presently known 45° lateral diverter valves are not at all versatile inasmuch as they do not provide, in the same valve, a capability of, on the one hand, completely shutting off the valve and, on the other hand, interconnecting the inlet conduit with both outlet conduits simultaneously. Moreover, those valves which can be completely shut off are of undesirably large size and are disadvantageous for this further reason.

The foregoing and other disadvantages of presently known 45° lateral diverter valves, as well as other types of rotary valves are overcome, in accordance with the invention, by a novel and improved rotary valve comprising a housing, a first conduit extending from one side of the housing, at least two second conduits extending from the opposite side of the housing, a valve plug rotatably mounted in the housing and having a passage therethrough arranged to be in alignment with the first conduit and with any one of the second conduits when the plug is in any one of a plurality of predetermined selected positions, and means for rotating the valve plug between the selected positions. The inlet conduit and one of the outlet conduits are disposed in axial alignment with each other so that straight-through passage of material through the rotary valve is afforded when the valve plug is positioned to communicate them. Another outlet conduit is positioned on the housing so that the passage in the valve plug communicates simultaneously with two adjacent outlet conduits when it is in the predetermined positions, and so that, at the same time, the valve plug passage can also be aligned in a position entirely out of communication with the two adjacent outlet conduits. The above-described versatility of use is attained by providing the following geometric relationships between the elements of the valve.

First of all, the axes of the inlet conduit and one of the outlet conduits are aligned along an axis $A_1$ and an adjacent one of the outlet conduits lies on an axis $A_2$ which intersects axis $A_1$ at a point $X_1$. An important feature of the rotary valve of the invention is that the plane $P_1$ of the axes $A_1$ and $A_2$ forms an angle substantially less than 90° with the plane $P_4$ of the inner face (the face abutting one end of the valve plug) of the housing member on which the outlet conduits are mounted, and the rotary plug is arranged to rotate about an axis $A_3$ which (a) passes through the point $X_1$, (b) lies in a plane $P_2$ which is perpendicular to plane $P_1$ and bisects the angle $B_1$ of intersection axes $A_1$ and $A_2$ and (c) lies at a substantial angle $B_3$ to the aforementioned plane $P_1$ of the axes $A_1$ and $A_2$. The axis $A_3$, of course, intersects the plane $P_4$, say at a point $X_2$, and is perpendicular thereto. It follows, therefore, that the lines connecting the point $X_2$ to the points $X_3$ and $X_4$ of intersection of the axes $A_1$ and $A_2$ form an angle substantially less than 180°.

The last-mentioned geometric relationships place the ends of outlet conduits relatively close to each other in the plane $P_4$. Furthermore, when there are only two outlet conduits, which is one preferred form of the invention, then there is a blank position in the plane $P_4$ of the housing and the rotary plug can be moved to a position at which the passage therethrough is blocked and in which the valve is completely closed. Moreover, the valve can be changed from one outlet to the adjacent outlet without at any time providing intercommunication between the inlet and both outlets simultaneously. On the other hand, the valve can also be set with both outlets in communication with the inlet at the same time. Thus, the valve is versatile in operation and is suited for a wide variety of purposes. A further important advantage of the above-described geometry of the rotary valve, in accordance with the invention, is that the diameter and thickness of the valve plug and therefore of the entire housing are both kept at a minimum.

Another novel and improved feature of the rotary valve of the invention is the provision of a flexible drive element which serves not only to rotate the valve plug but also mounts the valve plug for rotation in the housing.

For a better understanding of the invention, reference may be made to the following description of exemplary embodiments, taken in conjunction with the figures of the accompanying drawings, in which:

FIG. 5 is a view of a control element for use with the rotary valve of the invention, a part of the housing being removed and a part of the actuator being shown in section;

FIG. 6 is an elevational view of the inlet end of another embodiment of the valve of the invention;

FIG. 7 is a top view of the embodiment of FIG. 6;

FIG. 8 is an elevational view of the outlet end of the embodiment of FIG. 6; and FIG. 9 is a diagram showing the geometry of an exemplary rotary valve, according to the invention.

FIGS. 1 to 4 illustrate a 45° lateral diverter valve which consists of an inlet conduit 10 and two outlet conduits 12 and 14, the axes of the outlet conduits intersecting at an angle of 45°. The valve thus enables a fluid material conveyed through the inlet conduit 10 to be conducted into either one of the two outlets 12 or 14. Moreover, as will be described in greater detail hereinafter, the diverter valve of FIGS. 1 to 4 can also be used to provide flow from the inlet conduit 10 through the outlet conduits 12 and 14 simultaneously, if desired.

Figure 4:
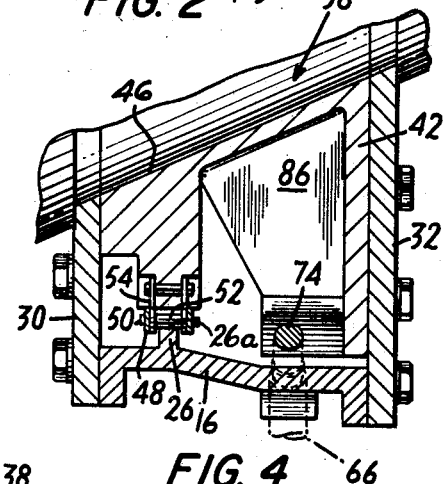
FIG. 4 is a partial view in section on an enlarged scale of a portion of the valve housing and the inlet conduit, the view taken generally along the line 4—4 of FIG. 3 and in the direction indicated by the arrows.
Figure 3:
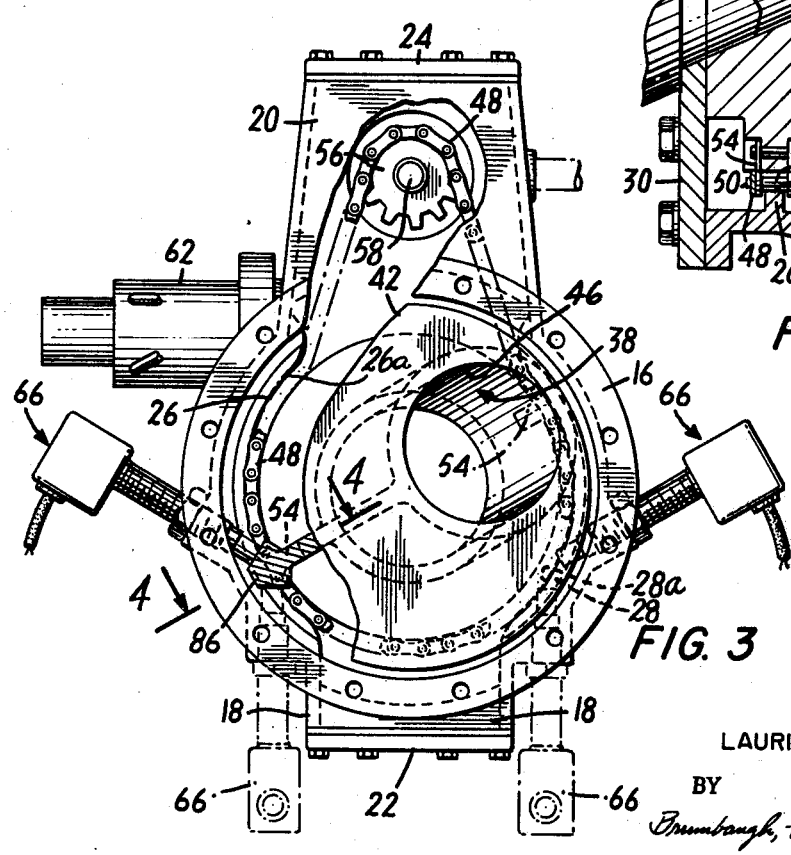
FIG. 3 is an elevational view of the outlet end of the valve of FIG. 1 on a somewhat larger scale than that of FIGS. 1 and 2, and illustrating the valve with the inlet cover housing removed, the view thus being taken generally along the line 3—3 of FIG. 2 and in the direction of the arrows.

The valve comprises a generally cylindrical housing 16 having a lower access opening 18 and an upper drive unit compartment 20, each of which is provided with a cover 22 and 24, respectively. As best shown in FIGS. 3 and 4, the cylindrical housing 16 is provided with a pair of inwardly directed valve plug carrier flanges 26 and 28, these flanges extending, respectively, about a substantial portion of the two segments of the housing on opposite sides of a diametrical plane. The inner surfaces 26a and 28a of the flanges 26 and 28 are annular.

Figure 1:
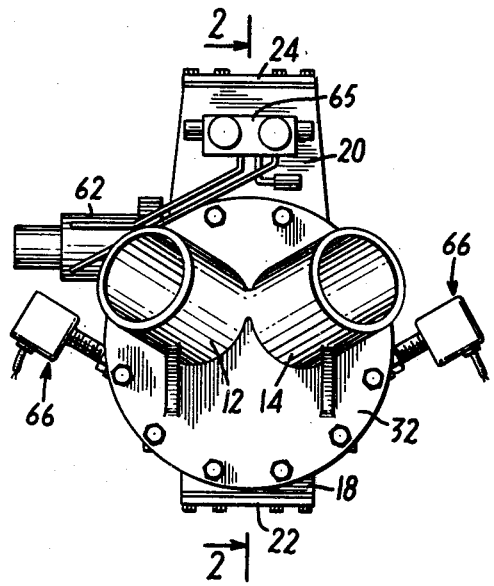
FIG. 1 is an elevational view of the outlet end of one embodiment of the rotary valve.
Figure 2:
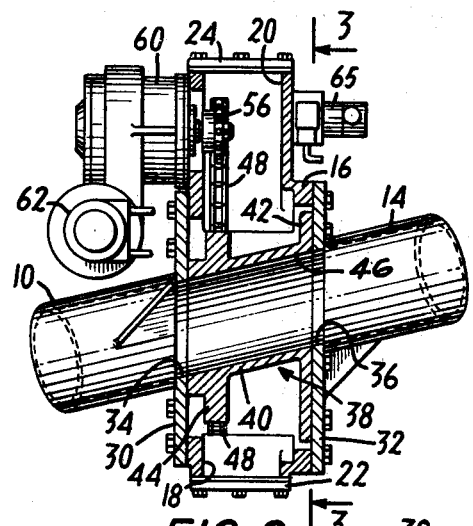
FIG. 2 is a view in section of the valve of FIG. 1 taken generally along the line 2—2 of FIG. 1 and in the direction of the arrows, but with parts thereof shown in rotated planes with respect to the line 2—2.

The inlet conduit 10 and the outlet conduits 12 and 14 are formed integrally with (or are welded to) respectively, an inlet housing cover plate 30 and an outlet housing cover plate 32, which are bolted to opposite ends of the cylindrical housing 16. The end cover plates 30 and 32 are provided with openings, designated by the reference numerals 34 and 36, respectively, which are substantially contiguous to the inner surfaces of the conduits 10, 12 and 14, and accordingly communicate the conduits with the interior of the valve housing. It will be noted that FIG. 2 is not a true section, but that the outlet conduit 14 and opening 36 have been rotated into the plane of the line 2—2 of FIG. 1. The positioning of the conduits of the valve will be better understood upon consideration of the description of FIG. 9 hereinafter.

Rotatably mounted within the cylindrical housing 16 is a valve plug 38 which consists of a generally cylindrical body 40, an outwardly extending annular flange 42 at one end which abuts the inner surface of the outlet housing cover plate 32, and a flange 44 spaced inwardly of the inlet housing cover plate 30, lying radially inwardly of the valve plug carrier flanges 26 and 28 and spaced therefrom, and having an outer annular surface co-axial with the annular surfaces 26a and 28a of the flanges 26 and 28. The cylindrical body 40 of the valve plug 38 defines a bore 46 which is arranged to be in alignment with the inlet conduit 10 and with either one of the outlet conduits 12 and 14. As mentioned above, FIG. 2 is not a true section, and the position of the bore 46 will be more readily apparent from a discussion of FIG. 9 to follow later.

The valve plug 38 is rotated, and also mounted for rotation, by a link chain 48. As best shown in FIG. 4, the links 50 of the chain rest against the outer surface of the valve plug flange 44, while the chain rollers 52 are carried on the inner annular surfaces 26a and 28a of the carrier flanges 26 and 28. The chain 48 extends around a substantial portion of the perimeter of the valve plug 44 and supports the valve plug 38 for rotation. Connector links 54 couple the chain to the valve plug.

The chain 48 is driven by a sprocket 56 located within the drive unit compartment 20 and carried on the driven shaft 58 of a speed reducer unit 60 which is mounted exteriorly of the housing. The gear reducer 60 is in turn driven by a drive motor 62, which may be, as shown, an air motor. Control means are coupled to the motor for stopping the rotation of the valve plug when it is oriented in a desired position. The control means includes an electrically operated valve unit 65 coupled to the motor, a control circuit (not shown) of suitable design which includes one or more starting switches for initiating the operation of the motor to move the rotary plug from one position to another, and stop switch units 66 inserted into the housing and engageable by the valve plug for stopping the motor 62 when the valve plug reaches a desired position. Suitable stop switches 66 are illustrated in detail in FIG. 5.

Referring now to FIG. 5, a stop switch unit comprises a housing 68 in which a microswitch 70 is mounted. Extending outwardly from and fastened by a bolt 72 to the housing 68 is a threaded stem 74 which carries an axially movable actuator rod 76. The rod 76 carries at its outer end a cap 78. Located between a shoulder 74a on the stem 74 and the inner end of a circumferential flange 78a on the cap 78 is a resilient bushing 80. Normally, the bushing holds the actuator rod 76 in an outermost position, as determined by adjusting bolts 82 and 83, in which the inner end of the actuator rod just touches the spring element 70a of the microswitch 70 when it is in its open position. When the outer end of the cap 78 is contacted by an element carried at a predetermined position on the valve plug 38, the actuator rod is pushed inwardly and pushes the spring arm 70a of the microswitch toward the switch body so that the switch actuator 70b is operated to close the switch.

More particularly, referring now to FIG. 3, the valve plug 40 is provided with an outwardly extending contact piece 86, and the stop switch units 66 are threaded into threaded openings provided in the cylindrical housing 16 in positions where the contact piece 86 engages the switch unit cap 78 and closes the microswitch when the valve plug is in a desired predetermined position. As will be described in more detail hereinafter, alternate positions for the switch units are provided.

Referring to FIGS. 6 to 8, an alternative embodiment is shown which is substantially the same as the embodiment of FIGS. 1 to 4 and thus the corresponding elements of the embodiment of FIGS. 6 to 8 are given the same numbers as the elements of the embodiment of FIGS. 1 to 4, except that the prime suffix is added. The only important structural difference between the two embodiments is that the embodiment of FIGS. 6 to 8 has three outlet conduits, designated 12′, 14′ and 15, rather than the two outlet conduits 12 and 14 in the embodiment of FIGS. 1 to 4. In addition, the control arrangement for stopping the valve plug in desired positions differs appropriately from the embodiment of FIGS. 1 to 4.

As previously mentioned, an important feature of the rotary valve of the invention is the geometrical arrangement of the inlet and outlet conduits and of the valve plug, which is illustrated diagrammatically in FIG. 9. First of all, the inlet conduit 10 is axially aligned with one of the outlet conduits, the conduit 12 in the illustrated embodiment. This provides an important advantage, namely, that for one position, the valve provides straight-through flow, thereby avoiding the substantial losses which occur in bends. The axis of the aligned conduits 10 and 12 is designated in FIG. 9 as $A_1$ and is intersected at the plane of the inner face of the housing cover plate 30 at a point designated $X_1$ by the axis $A_2$ of the outlet conduit 14. In the particular embodiment of FIG. 1, the angle $B_1$ of intersection between axes $A_1$ and $A_2$ is 45°.

The axes $A_1$ and $A_2$ of the outlet conduits 12 and 14 intersect the plane $P_4$ of the inner surface of the outlet housing cover plate 32, at points designated $X_3$ and $X_4$. The axis $A_3$ of rotation of the valve plug 38 (a) passes through the point $X_1$ (b) lies in a plane $P_2$ which is perpendicular to the plane $P_1$ of the axes $A_1$ and $A_2$ and which bisects the angle $B_1$ between the axes $A_1$ and $A_2$ and and (c) forms an angle $B_3$ in the plane $P_2$ with the plane $P_1$. The point at which the axis $A_3$ of rotation of the valve plug intersects the plane $P_4$ of the inner surface of the housing member 32 is designated as $X_2$.

In the rotary valve of the invention, the lines connecting the point $X_2$ with points $X_3$ and $X_4$ (the points at which the axes $A_1$ and $A_2$ intersect the plane $P_4$ of the inner surface of the housing cover plate 32) form an angle $B_2$ which is substantially less than 180°. In the embodiment of FIGS. 1 to 4, the angle $B_2$ is 120°. By making the angle $B_2$ substantially less than 180°, the rotary valve can be operated in either of two ways. First, the valve plug can be rotated through the angle $B_2$, or positioned anywhere within the angle $B_2$, and the inlet conduit 10 is in communication with both of the outlet conduits 12 and 14 simultaneously. On the other hand, the valve plug may be rotated to change its position through the external angle between the lines $\overline{X_2X_4}$ and $\overline{X_2X_3}$. In this case the valve is completely closed at some stage, and at no time are the two outlet conduits 12 and 14 brought into simultaneous communication with the inlet conduit 10. Thus, the valve of the invention provides for (1) selective communication between the inlet conduit and any one of the outlet conduits (2) simultaneous communication of the inlet conduit with two adjacent outlet conduits and (3) complete closure of the inlet from all of the outlet conduits.

Referring briefly to FIG. 3, the control means for the valve can be readily modified to suit either of two methods of operation. First, the stop switch units can be installed in the positions illustrated in solid lines, and in these positions, the valve is arranged to be operated by turning the plug through the internal or included angle $B_2$ between the lines $\overline{X_2X_3}$ and $\overline{X_2X_4}$, the inlet conduit being in simultaneous communication with both outlet conduits as the valve position is changed. Secondly, the stop switch units can be installed in the positions represented by the dotted lines, in which case, the valve is turned through the external angle between lines $X_2X_3$ and $\overline{X_2X_4}$ and one outlet conduit is fully closed off before the other is opened.

Other control systems, or manual control, can readily be used with the valve. For example, the valve plug can be set so that the plug bore is partly opened to both outlets in predetermined proportions to provide controlled distribution of simultaneous flow through two adjacent outlets. It can also be set to a fully closed position in which the plug bore is aligned with the bisector of the external angle between lines $\overline{X_2X_3}$ and $\overline{X_2X_4}$. With the embodiment of FIGS. 6 to 8, the third outlet conduit 15 provides a third flow path or it can serve, for example, as a dumping point for removing one material from a pipe system before another is fed through it.

The arrangement of the outlet conduits such that the planes including the axes of adjacent ones lies at substantial angles to the axis of rotation of the valve plug provides for a reduction in size of the valve, as compared to valves in which the axis of rotation of the valve plug lies in a plane through the axis of two of the outlet conduits. The above-described embodiment of the invention in which the outlet conduits are located 120° apart on the outlet housing plate provides an optimum reduction in size of the valve. Moreover, the reduction in size occurs not only in planes normal to the axis of rotation of the valve plug, but also in the thickness of the valve plug. For example, in the embodiment of FIGS. 1 to 4, the angle $$B_3 \left( \sin^{-1} \left( \tan \frac{B_1}{2} \Big/ \tan \frac{B_2}{2} \right) \right)$$

is 13.85° and the thickness of the plug is equal to ½ the distance between points $X_3$ and $X_4$ times $$\left( \cos B_3 / \tan \frac{B_1}{2} \right)$$

Thus it can be seen that as the angle $B_3$ increases, the thickness of the valve decreases.

I claim:

1. A rotary valve comprising a housing including spaced-apart end members having inner surfaces disposed in planes parallel to each other, a first conduit communicating with the housing through one of the end members, at least two second conduits communicating with the housing through the other end member, the first conduit and one of the second conduits being aligned on an axis $A_1$ and the second conduit being aligned along on axis $A_2$ which intersects the axis $A_1$ at a point $X_1$ and forms an angle $B_1$ therewith, and a valve plug rotatably mounted in the housing between the end members and having a passage therein disposed so as to be in selective registration with the first conduit and with any one of the second conduits when the plug is in a selected angular position, and the axis of rotation of the valve plug being a line $A_3$ (a) passing through the point $X_1$, (b) lying in a plane $P_2$ which passes through point $X_1$, bisects the angle $B_1$, and is perpendicular to the plane $P_1$ of the axes $A_1$ and $A_2$ and (c) forming an angle $B_3$ with the plane $P_1$ substantially less than 90°.

2. A rotary valve comprising first and second spaced-apart housing members having inner surfaces lying in parallel planes $P_3$ and $P_4$, respectively, a first conduit extending outwardly from the first housing member and communicating therethrough into the space between the housing members, at least two second conduits extending outwardly from the second housing member and communicating therethrough into the space between the housing members the first conduit and one of the second conduits being axially aligned with each other along an axis $A_1$ and the axis $A_2$ of an adjacent second conduit intersecting the axis $A_1$ at a point $X_1$ which lies on the plane $P_3$ at an angle $B_1$, a valve plug mounted between the housing members for rotation about an axis $A_3$ which passes through the point $X_1$ and intersects the plane $P_4$ at a point $X_2$, the axis $A_3$ forming an angle with the plane $P_1$ of the axes $A_1$ and $A_2$ substantially less than 90°, the valve plug having a passage therethrough and having surfaces surrounding the passage abutting the respective first and second housing members, the valve plug passage having an axis coincident with the axis $A_1$ when the plug is in a first predetermined position, and means coupled to the valve plug for rotating it into selected predetermined positions.

3. A rotary valve according to claim 2 wherein the said one and adjacent second conduits intersect the plane $P_4$ at points $X_3$ and $X_4$, respectively, equidistant from the point $X_2$, and the angle $B_2$ between the line connecting point $X_3$ to the point $X_2$ and the line connecting point $X_4$ to point $X_2$ is substantially less than 180°.

4. A rotary valve according to claim 3 wherein the axis $A_3$ of rotation of the valve plug lies in a plane $P_2$ which bisects the angle $B_1$ between axes $A_1$ and $A_2$ and which is perpendicular to the plane $P_1$ of axes $A_1$ and $A_2$ and wherein the axis $A_3$ of rotation of the valve plug forms an angle $B_3$ with the plane $P_1$, the sine of angle $B_3$ being equal to $(\tan B_1/2)$ divided by $(\tan B_2/2)$.

5. A rotary valve according to claim 4 wherein the thickness of the plug is equal to ½ the distance between points $X_3$ and $X_4$ times $$\left(\cos B_3 / \tan \frac{B_1}{2}\right)$$

6. A rotary valve according to claim 5 wherein there are only two second conduits.

7. A rotary valve according to claim 6 wherein the angle $B_2$ is approximately 120°.

8. A rotary valve according to claim 5 wherein there are only three second conduits.

9. A rotary valve according to claim 8 wherein the angle $B_2$ is approximately 120°, and wherein the axis of the third of the three second conduits intersects the plane $P_4$ at a point $X_5$ and the angle between the line connecting points $X_2$ and $X_4$ and the line connecting the points $X_2$ and $X_5$ is approximately 120°.

10. A rotary valve according to claim 2 wherein the means for rotating the valve plug includes a flexible drive member extending at least partially around and coupled to the valve plug, and powered means for selectively driving the flexible drive member to rotate the valve plug.

11. A rotary valve according to claim 10 wherein the flexible drive member is a chain.

12. A rotary valve according to claim 10 comprising a peripheral housing member surrounding the valve plug and secured to the first and second housing members, the peripheral housing member including an inwardly directed flange defining an annular inner surface, and wherein the valve plug includes an outwardly extending flange having an annular outer surface coaxial with the inner surface of the flange on the peripheral housing member, the flexible drive member bearing against one of the said annular surfaces and having rotatable members bearing against the other of the said annular surfaces, whereby the valve plug is rotatably supported within the peripheral housing by the inwardly directed flange.

13. A rotary valve according to claim 2 wherein there are only two second conduits, the axes $A_1$ and $A_2$ intersecting the plane $P_4$ at points $X_3$ and $X_4$ located substantially 120° apart relative to the point $X_2$ and being closely spaced to provide concurrent communication between the valve plug passage and both the second conduits when the valve plug is in a range of selected positions, and wherein the second housing member includes a blank position centered substantially 120° from each of the points $X_3$ and $X_4$, the blank position affording a valve shut-off point.

14. A rotary valve according to claim 13 wherein the means for rotating the valve plug into selected positions is operable to shift the valve plug in either direction, whereby the valve is either closed upon rotating it in a direction so that it passes the valve shut-off point or wherein simultaneous communication with both second conduits is provided upon rotating the valve plug in the other direction.

15. In a rotary valve including housing having a pair of spaced-apart housing end members with parallel inner surfaces, an inlet conduit communicating with the housing through one of the members and at least two outlet conduits communicating with the housing through the other end member, a peripheral housing member secured to the first and second housing members, and a valve plug rotatably mounted in the housing between the end members and having a passage disposed so as to be in selective registration with the first conduit and any one of the second conduits, the combination of a mounting for the valve plug comprising a formation on the housing member defining an arcuate inwardly facing surface, a formation on the valve plug defining an arcuate outwardly facing surface coaxial with and spaced from the said arcuate surface on the housing member, and an endless chain received between the arcuate surfaces of the housing member and valve plug, the chain including rotatable members and being positioned between the arcuate surfaces and constituting rolling support for the valve plug within the housing.

16. A rotary valve according to claim 15 wherein the endless chain is secured to the valve plug at at least one point, and further comprising drive means coupled to the chain to move the chain and thereby rotate the valve plug, whereby the chain further serves to rotate the valve plug as well as rotatably mount it in the housing.

17. A rotary valve according to claim 15 wherein the chain includes a series of rolls interconnected by and rotatable relative to a series of links, the links engaging one of the arcuate surfaces and the rolls engaging the other of the arcuate surfaces.

18. A rotary valve according to claim 17 wherein the formation on the housing member is an inwardly extending flange, the arcuate surface of the housing flange engaging the rolls only and the arcuate surface of the valve plug engaging the links only, whereby the valve plug and chain rotate together relative to the housing as the chain rolls along the housing flange.

19. A rotary valve according to claim 18 wherein the endless chain is secured to the valve plug at at least one point, and further comprising drive means coupled to the chain to move the chain and thereby rotate the valve plug, whereby the chain further serves to rotate the valve plug as well as rotatably mount it in the housing.

References Cited

UNITED STATES PATENTS

| 1,080,134 | 12/1913 | Amsler | 251—294 XR |
| 1,095,209 | 5/1914 | Humphrey | 251—294 XR |
| 1,197,238 | 9/1916 | Shue | 137—625.22 XR |
| 2,391,196 | 12/1945 | Sanderson | 137—625.11 |
| 2,414,154 | 1/1947 | Leef | 68—140 |
| 1,095,209 | 5/1914 | Humphrey | 251—294 |
| 1,343,490 | 6/1920 | Albertson | 137—625.47 |
| 2,391,196 | 12/1945 | Sanderson | 137—625.11 |
| 3,199,537 | 8/1965 | Swanson | 137—625.47 |

FOREIGN PATENTS

| 937,899 | 9/1963 | Great Britain. |
| 819,648 | 7/1937 | France. |

HENRY T. KLINKSIEK, Primary Examiner

U.S. Cl. X.R.

251—294